United States Patent [19]

Kanno et al.

[11] Patent Number: 5,414,306
[45] Date of Patent: May 9, 1995

[54] PROTECTING APPARATUS FOR ELECTRONIC DEVICE OF VEHICLE HAVING SOLAR BATTERY AND STORAGE BATTERY

[75] Inventors: Yoshihisa Kanno; Shinshi Kajimoto, both of Hiroshima; Masayuki Jinno, Higashihiroshima, all of Japan

[73] Assignees: Naldec Corporation; Mazda Motor Corporation, both of Hiroshima, Japan

[21] Appl. No.: 216,248

[22] Filed: Mar. 21, 1994

Related U.S. Application Data

[63] Continuation of Ser. No. 797,918, Nov. 26, 1991, abandoned.

[30] Foreign Application Priority Data

Nov. 30, 1990 [JP] Japan .................................. 2-340094
Nov. 15, 1991 [JP] Japan .................................. 3-300015

[51] Int. Cl.$^6$ .................................. H02H 7/20
[52] U.S. Cl. .................................. 307/87; 307/48; 307/130
[58] Field of Search .................. 323/906; 340/636; 307/9.1, 10.1, 10.7, 87, 66, 70, 130, 150, 48; 320/6, 19; 364/183, 186, 187, 424.05

[56] References Cited

U.S. PATENT DOCUMENTS

| | | | |
|---|---|---|---|
| 4,266,178 | 5/1981 | Asakawa | 323/906 X |
| 4,296,489 | 10/1981 | Mitsui | 323/906 X |
| 4,571,690 | 2/1986 | Munetsugu | 323/906 X |
| 4,701,693 | 10/1987 | Nishimura | 323/906 X |
| 4,827,149 | 5/1989 | Yabe | 307/116 X |
| 4,911,257 | 3/1990 | Kajimoto et al. | 320/30 X |
| 4,963,811 | 10/1990 | Weber | 323/906 X |
| 5,025,202 | 6/1991 | Ishii et al. | 323/906 X |
| 5,167,573 | 12/1992 | Kanno et al. | 454/164 |

FOREIGN PATENT DOCUMENTS 3121864 5/1982 Germany .
59-51451 12/1984 Japan .
1-172016 7/1989 Japan .

OTHER PUBLICATIONS

German Office Action dated May 11, 1992 issued in the matter of P 41 39 436.4-32-Naldec Corporation (with English translation).

Primary Examiner—A. D. Pellinen
Assistant Examiner—Fritz M. Fleming
Attorney, Agent, or Firm—Staas & Halsey

[57] ABSTRACT

A protecting apparatus protects an electronic device which is provided on a vehicle having a storage battery and a solar battery and which inputs output voltages of the storage battery and the solar battery to the electronic device. The protecting apparatus includes a voltage determining unit for determining whether or not the output voltage of the storage battery is normal, an interruption unit for interrupting a path from the solar battery to the electronic device, and a control unit for controlling the interruption unit and thereby interrupting the path when the voltage determination unit determines that the voltage of the storage battery is not normal.

7 Claims, 13 Drawing Sheets

| OPERATION SWITCH 2 | FORCED VENTILATION IS ON | | OFF | | PARKING VENTILATION IS ON | | | |
|---|---|---|---|---|---|---|---|---|
| IG SWITCH 8 | ON | NOT ON | ON | NOT ON | KEY IS INSERTED | KEY IS REMOVED | | |
| TEMPERATURE OF OUTDOOR | | | | | | ≤ 7°C | 7~15°C | ≥ 15°C |
| POWER SOURCE TIMER | | | FORCED VENTILATION FOR TEN MINUTES AFTER ON | | | | | |
| MODE | FORCED VENTILATION | CHARGING | FORCED VENTILATION | CHARGING | CHARGING | — | CHARGING OR PARKING VENTILATION | PARKING VENTILATION |

FIG. 7

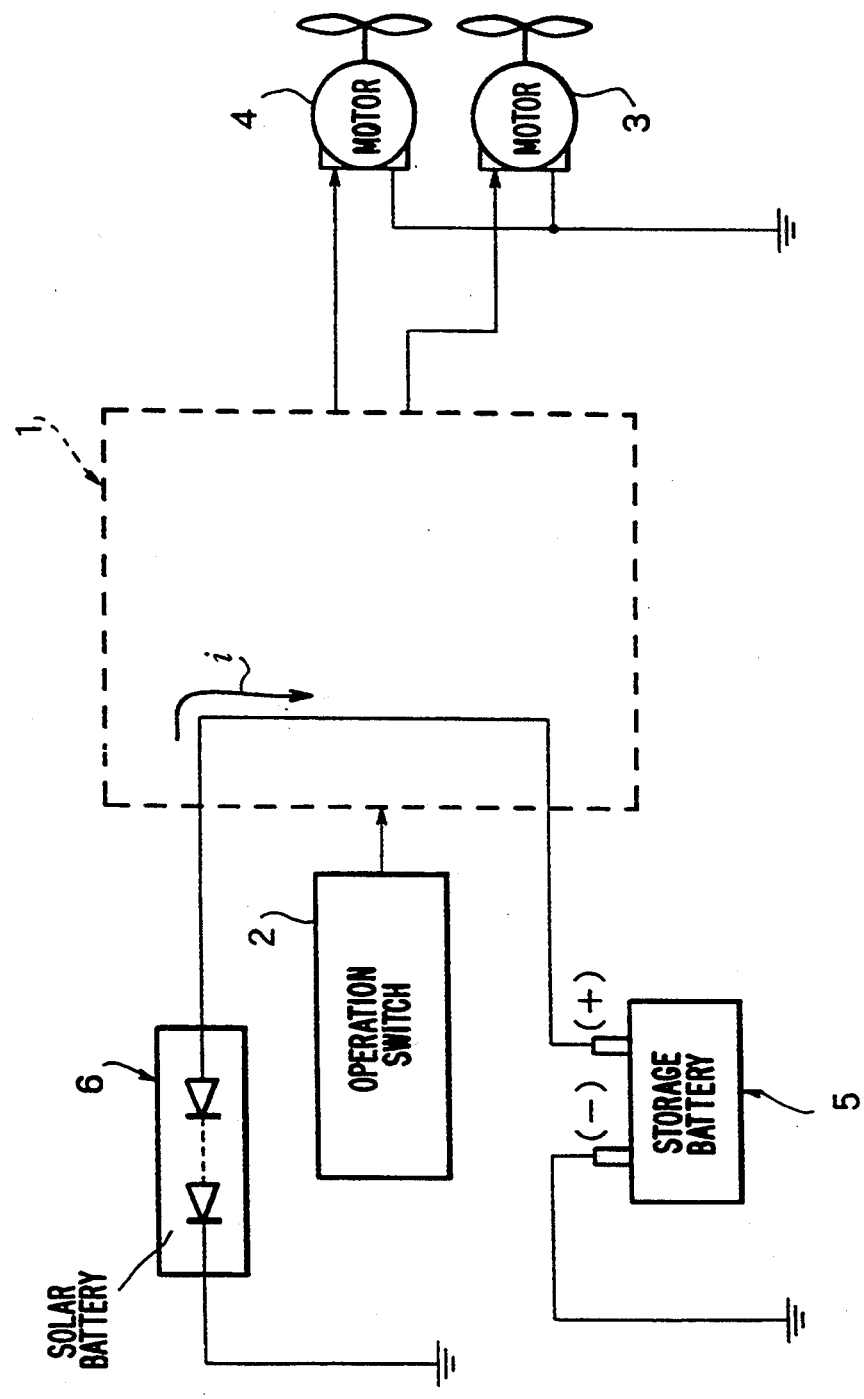

PROTECTING APPARATUS FOR ELECTRONIC DEVICE OF VEHICLE HAVING SOLAR BATTERY AND STORAGE BATTERY

This application is a continuation of application Ser. No. 07/797,918, filed Nov. 26, 1991, now abandoned.

BACKGROUND OF THE INVENTION

The present invention relates to a protecting apparatus for protecting an electronic device provided in a vehicle having a storage battery and a solar battery and driven by power supplied from these sources.

In recent years, vehicles in which part of the electrical equipment thereof, such as ventilating fans, is driven by a solar battery have been proposed. Such a vehicle is disclosed in, for example, Japanese Patent Publication No. 51451/1984.

Since the output of the solar battery varies in accordance with the amount of sunlight, it cannot be supplied as a stable voltage. Hence, the electrical equipment of the type which employs the output voltage of the solar battery as the driving power source is generally driven by a combination of the solar battery and a storage battery mounted on the vehicle. The output voltage of the storage battery mounted on the vehicle is passed through a constant voltage circuit which is operated at a predetermined reference voltage (for example, $V_{DD}=5$ volts), and is then applied to a load circuit (a control unit of the electrical equipment) as the constant voltage (see Japanese Patent Laid-Open No. 172016/1989).

At a solar battery power input portion of the load circuit, a voltage monitoring circuit constituted by, for example, a resistance type potential dividing circuit, is provided to monitor the output voltage $V_{SC}$ (for example, $V_{SC}=0$ to 20 volts) of the solar battery. A predetermined constant voltage circuit controls the voltage on the basis of the results of the monitoring so, that the constant voltage can be supplied to the load circuits.

Such a constant voltage circuit or a monitoring circuit generally employs active devices, such as transistors or ICs. These active devices are designed to be driven by power supplied from the storage battery, because they may be operated during the night time when the solar battery cannot be operated. Generally, CMOS devices are used as these active devices because of their low power consumption.

FIG. 1 is a circuit diagram illustrating how an output of a solar battery is input to a CMOS device 100 which constitutes part of the aforementioned constant voltage circuit or monitoring circuit. The CMOS device 100 is driven by the constant voltage $V_{DD}$ obtained from the output of the storage battery, as stated above. The switching device 100 monitors $V'_{SC}$ into which the output $V_{SC}$ of solar battery is divided by resistors $R_m$, $R_n$ on an input line 102. A protective diode 101 protects the CMOS device 100 when the voltage on the line 102 exceeds $V_{DD}$. Generally, the monitoring circuit is formed of the CMOS device 100, protective diode 101 and resistors $R_m$, $R_n$.

When the power supplied voltage $V_{DD}$ to the CMOS device lowers to a predetermined reference voltage or less, $V'_{SC} << V_{DD}$ occurs. In such a situation, an overcurrent will flow through the diode 101 and diode 101 will be damaged. Furthermore, an upper FET circuit of FIG. 1 is reverse-biased and the monitoring circuit will not work properly due to the deterioration of the FET.

For the reason described above, a CMOS device has a critical maximum rated voltage, that is a voltage which must not be exceeded so that the device may be assured to properly operate. The critical maximum rated voltage is generally around $V_{DD}+0.3$ volt.

In the circuit of FIG. 1, the values of the resistors $R_m$, $R_n$ are set in advance so that $V'_{SC}$ might not exceed 5.3 volt, preferably, $V'_{SC}=5$ V.

If the output voltage of the storage battery lowers to a predetermined reference voltage or less due to over discharge or removal of the battery, the constant voltage circuit cannot control the voltage, and the critical maximum rated voltage of CMOS device 100 goes to 0.3 volt. In such a situation, where there is an amount of sunlight on the solar battery, $V'_{SC}$ goes to 20 volt. Therefore, $R_m$ and $R_n$ which are set by a manufacturer of the CMOS 100 cannot prevent $V'_{SC}$ from exceeding the critical maximum rated voltage=0.3 volt, thereby, resulting in the breakage of the device.

SUMMARY OF THE INVENTION

In view of the aforementioned problems of the conventional techniques, a primary object of the present invention is to provide a protecting apparatus which is capable of preventing breakage of circuit components by the output of a solar battery when a storage battery over discharges or is removed.

To achieve the aforementioned object, the present invention provides a protecting apparatus for protecting an electronic device which is provided on a vehicle having a storage battery and a solar battery and which inputs via a path the output voltage of the solar battery, the protecting apparatus comprising:
- a determining means for determining whether or not the output voltage of the storage battery is normal;
- an interruption means for interrupting the path from the solar battery to the electronic device; and
- a control means for controlling the interruption means to interrupt the path from the solar battery to the electronic device when the determining means determines that the output voltage of the storage battery is not normal.

According to the present invention, when the determining means determines that the voltage of the storage battery is not normal, the interruption means interrupts the path from the solar battery to the electronic device to protect the electronic device.

In a preferred form of the invention, the electronic device comprises a CMOS element.

In a preferred form of the invention, the electronic device uses the output of the storage battery as a power source.

In a preferred form of the invention, the interruption means comprises a switching circuit provided on the path.

In a preferred form of the invention, the determining means includes a means for monitoring normal operation of the electronic device, and inputs an output of the monitoring means to a control terminal of the switching circuit.

In a preferred form of the invention, the electronic device comprises a CMOS element which uses the output of the storage battery as a power source, and the interruption means comprises a switching circuit provided on the path. An output signal of the electronic device is input to a control terminal of the switching circuit.

In a preferred form of the invention, the determining means includes a means for comparing the output of the storage battery with a reference voltage.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 7 is a diagram explaining the operation modes of the control device;

FIGS. 9A through 9C are block diagrams illustrating the flow of current in the respective operation modes for the embodiment according to the present invention;

DETAILED DESCRIPTION OF THE PREFERRED EMBODIMENT

Figure 1:
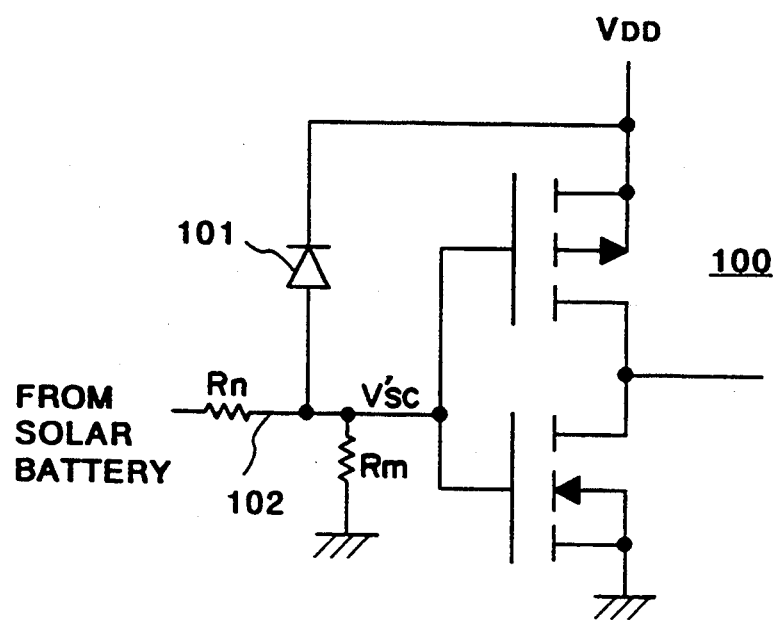
FIG. 1 is a circuit diagram illustrating a part of a constant voltage circuit as background of the invention.
Figure 2:
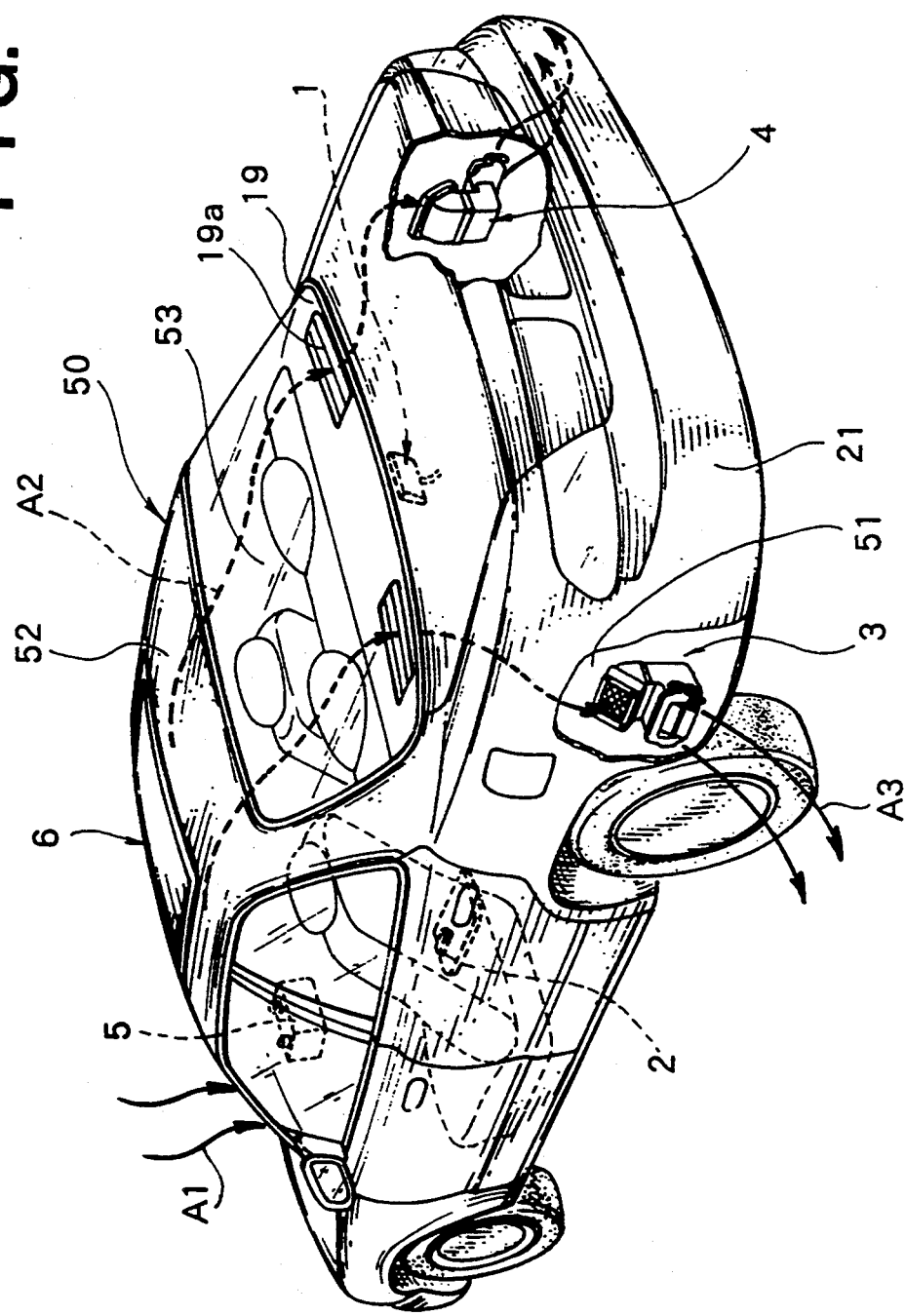
FIG. 2 is a perspectives view of a vehicle to which the present invention is applied, as seen when looking from the rear and left thereof.

A preferred embodiment of the present invention, in which a protective device is applied to a ventilation system in which a solar battery is utilized as a power source for a preliminary ventilating device, will now be described with reference to the accompanying drawings. FIG. 2 is an illustration of a passenger car 50 with a preliminary ventilating device mounted thereon, as seen when looking from the left and rear side thereof, partly broken away and the interior thereof being seen through.

In FIG. 2, a known storage battery 5, which is the secondary cells that can be charged and discharged repeatedly, is disposed in an engine compartment in the front portion of the passenger car 50, and a solar battery 6 made of amorphous silicon is disposed on the front portion of a roof 52. The solar battery 6 has the photoelectric conversion function and is suitably transparent. In a trunk 51, a first ventilating fan 3 and a second ventilating fan 4 are provided at the two sides thereof. Both the ventilating fans 3 and 4 communicate with a vent 19a in a rear tray 19 via special ventilation passages (not shown), respectively. They are connected to a ventilation control device 1 provided in the trunk 51 so that they can be controlled under predetermined conditions. An operation switch 2 operated to select either of the ventilation modes, which will be described later, is provided on an operation panel between a driver's seat and a passenger's seat. The operation switch 2 is connected to the control device 1.

In the preliminary ventilating device arranged in the aforementioned manner, the drive of the first and second ventilation fans 3 and 4 is controlled on the basis of the operation of the operation switch 2 so as to introduce an air A1 from a vent of a ventilation device provided in the front of the passenger car 50 into an passenger compartment 53, to replace a high temperature air A2 in the passenger compartment with the air A1, and then to discharge an exhaust air A3 from the vent 19a in the rear tray 19 by the first and second ventilation fans 3 and 4 toward the rear side of a bumper 21.

Figure 3:
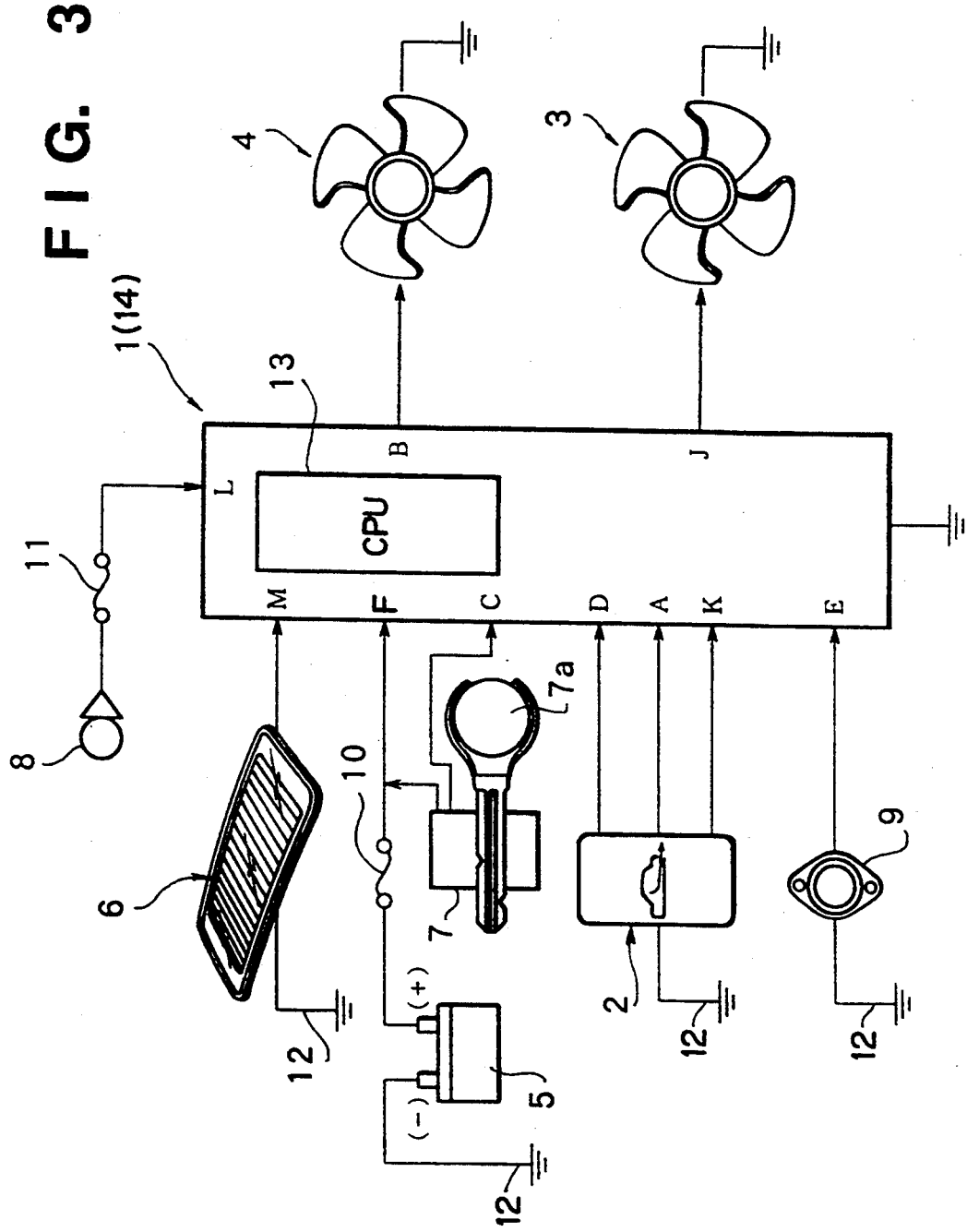
FIG. 3 is a block diagram of a control device of an embodiment of the present invention.
Figure 4:
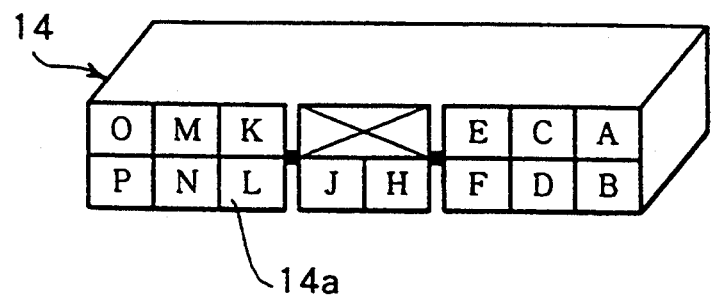
FIG. 4 is an illustration of a connector for the control device of FIG. 3.

Turning to FIG. 3 which is a block diagram of the ventilation control device 1, and related components the control device 1 includes a microprocessor 13 (hereinafter referred to as a CPU) for executing various control operations on the basis of the signals input thereto, and driving circuits which will be described later. The control device 1 is accommodated in a box shown in FIG. 2. The control device 1 is connected at respective output band J to the first and second ventilating fans 3 and 4 and other components through pins 14a of a connector 14 provided integrally with the control device 1 so as to facilitate assembly and maintenance. The pins 14a are arranged in the manner shown in FIG. 4. The control device 1 will be described later in more detail with reference to FIG. 8.

As shown in FIG. 3, an ignition switch 8 (hereinafter referred to as an IG switch) for detecting the operation of an engine is connected at input W to the control device 1 through a fuse 11 for an air conditioner power source. A negative side of the aforementioned solar battery 6 is connected to a grounding conductor 12 of the car body, and a positive side thereof is connected at input M to the control device 1. A negative side of the storage battery 5 is connected to the grounding conductor 12, and a positive side thereof is connected at input F to the control device through a fuse 10 for an interior power source. A key detecting switch 7 for detecting the presence/absence of an engine key 7a used to operate the IG switch 8 is connected to a line connected at input C to the control device 1 and to the positive side of the storage battery 5.

The operation switch 2 operated to designate the ventilation mode outputs three types of signals (forced ventilation mode, parking ventilation mode and charging mode), which are input on inputs D, A, and K to the control device 1. A temperature sensor 9 is provided integrally with the first ventilating fan 3. The temperature sensor 9 is connected, at input E to the control device 1 so, that the results of the detection of the temperature of the air can be input to the control device 1 so as to allow controls which will be described later to be executed.

Figure 5:
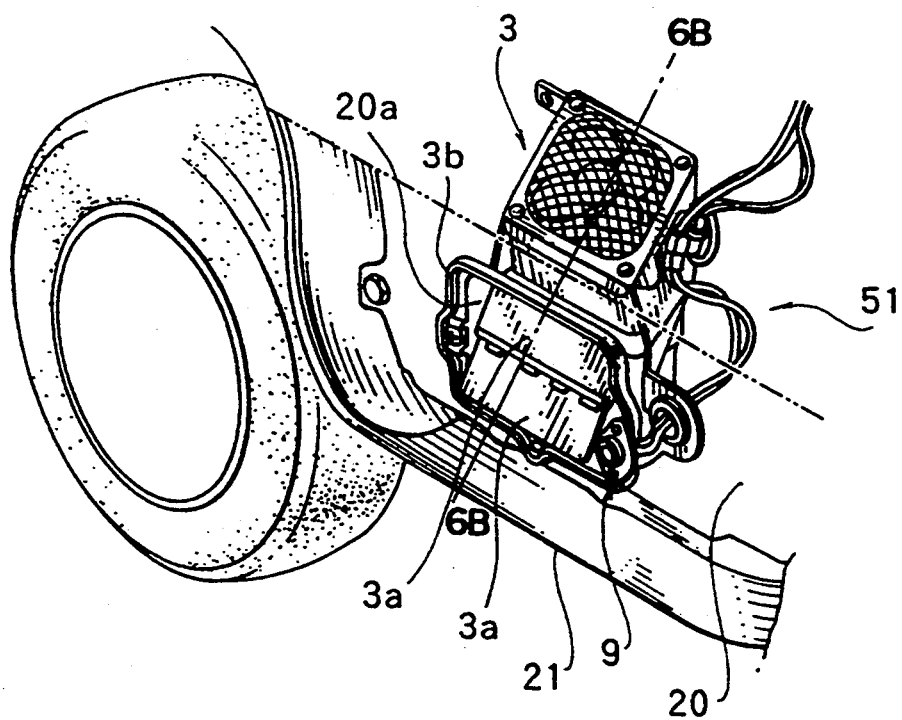
FIG. 5 is an illustrative view of how a ventilating fan is mounted to a vehicle.
Figure 6A:
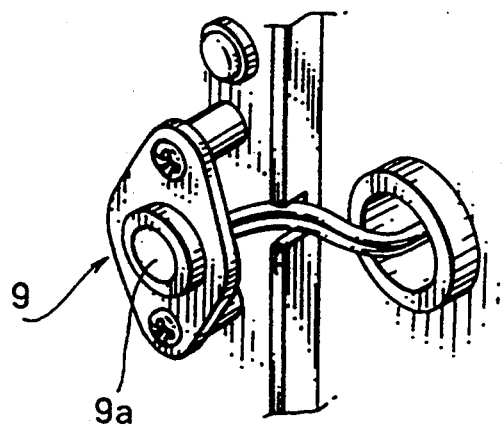
FIGS. 6 and 6B are schematic views showing the structure of a ventilating fan of the embodiment according to the present invention.
Figure 6B:
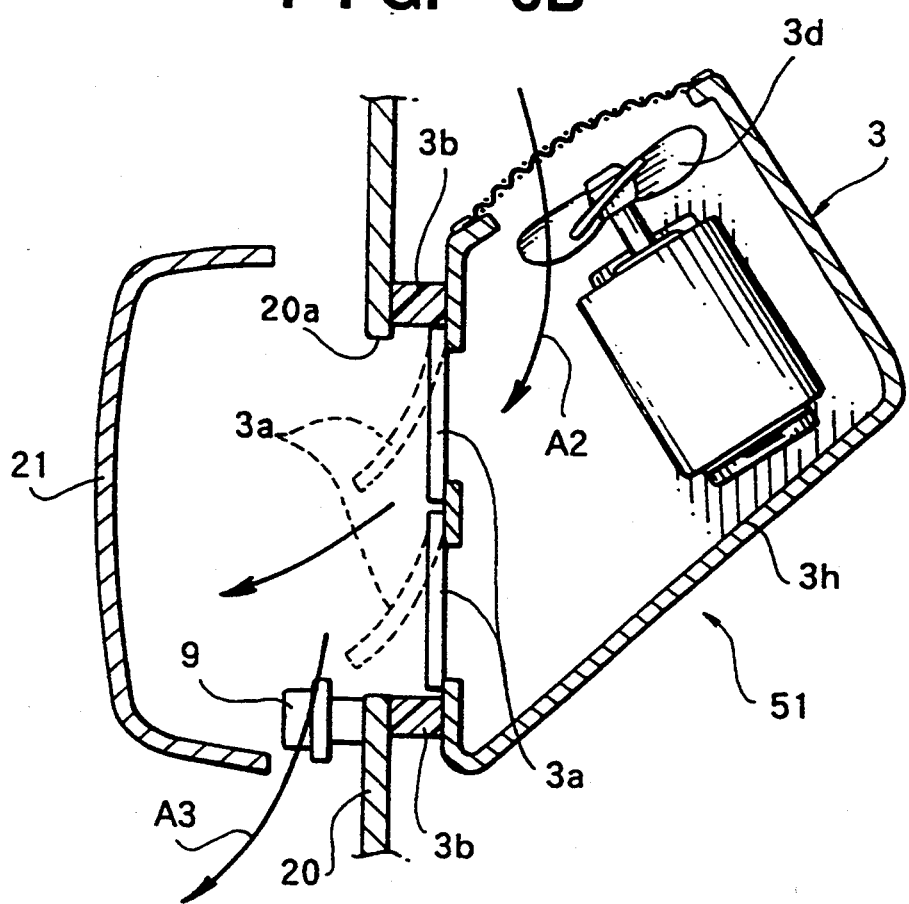

FIG. 5 illustrates how the first ventilating fan 3 is mounted, FIG. 6A is an enlarged view of the temperature sensor 9, and FIG. 6B is a section taken along a line 6B—6B of FIG. 5. Referring first to FIG. 5, the first and second ventilating fans 3 and 4 have substantially the same structure with the exception that the second ventilating fan 4 has the temperature sensor 9, and are mounted in the same manner.

As shown in FIG. 5, the first ventilating fan 3 is fixed to a side panel 20 with a sponge rubber-like sealing member 3b therebetween. The sealing member 3b hermetically seals the periphery of an opening 20a formed in the lower portion of the side panel 20 of the trunk 51. The temperature sensor 9 is fixed in the vicinity of the opening 20a such that a sensor portion 9a thereof is directed outward, as shown in FIG. 6A, so as to detect the temperature near the rear side of the bumper 21. Lids 3a made of rubber are provided in two stages at an exhaust outlet portion of the ventilating fan 3. The upper edge portion of each of the lids 3a is supported such that the lid can be automatically opened and closed in accordance with the drive of the ventilating fan 3.

When the ventilating fan 3 or 4 is driven, each of the lids 3a is moved to a position indicated by a broken line due to the air pressure, as shown in FIG. 6B, and the exhaust air A3 is thereby discharged to the outside from between the rear side of the bumper 21 and the side panel 20. When the drive of the ventilating fan 3 or 4 is stopped, the lid 3a made of rubber returns to the position indicated by the solid line due to its own weight, and thereby prevents the air or rain drops from flowing into the trunk 51. Since the side panel 20 in which the opening 20a is formed is located at the rear of the bumper 21, the appearance of the vehicle is not spoiled and the lids 3a are not directly exposed to the wind or rain. Also, the temperature sensor 9 may not be soiled.

The ventilating fans connected to the control device and provided within the trunk are driven in accordance with the operated state of the operation switch 2, the presence or absence of the IG switch 8, the state of the air and the open-circuit voltage of the solar battery by the control device which automatically sets the operation mode of the ventilating fans.

Figure 9A:
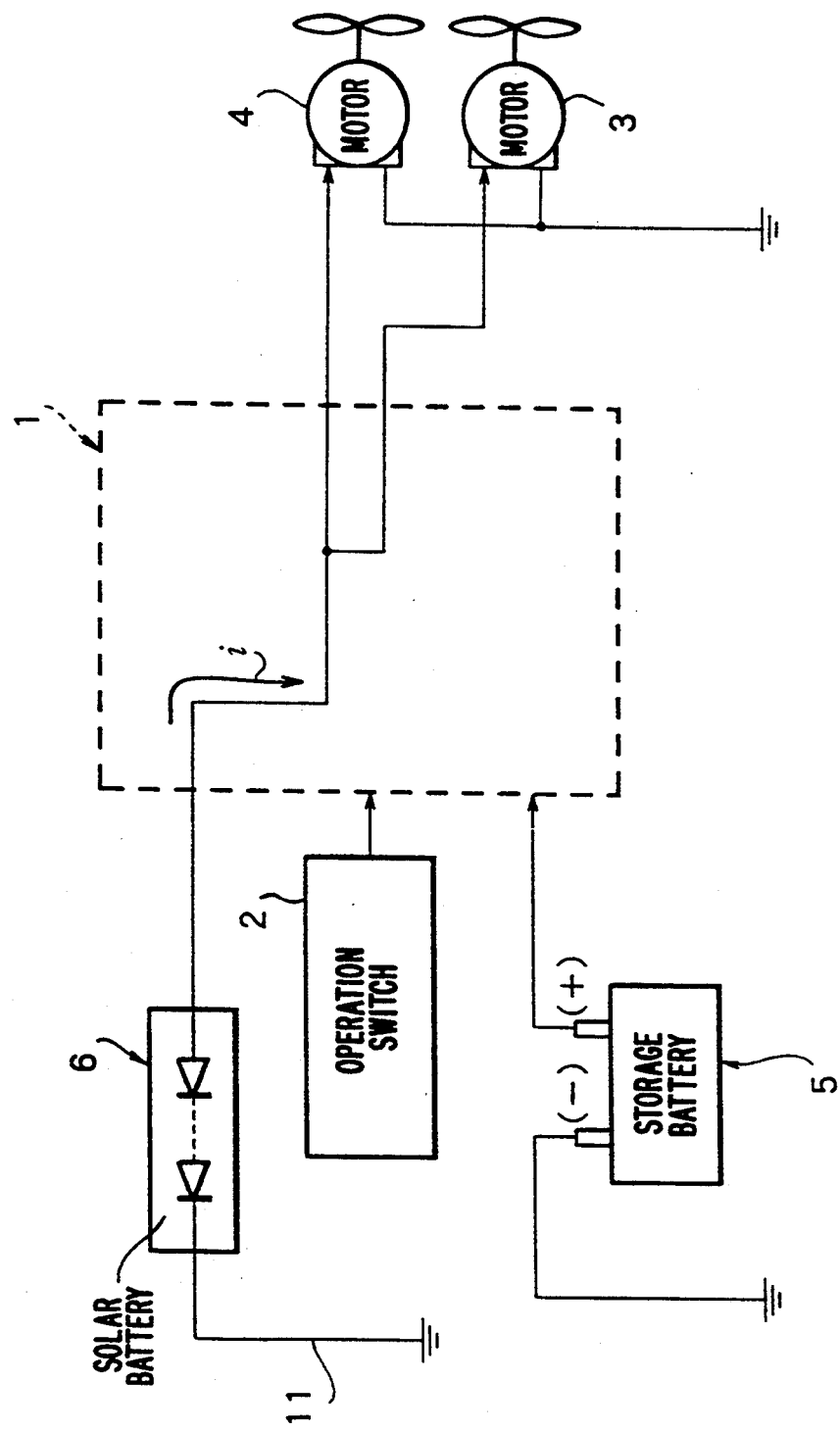
Figure 9B:
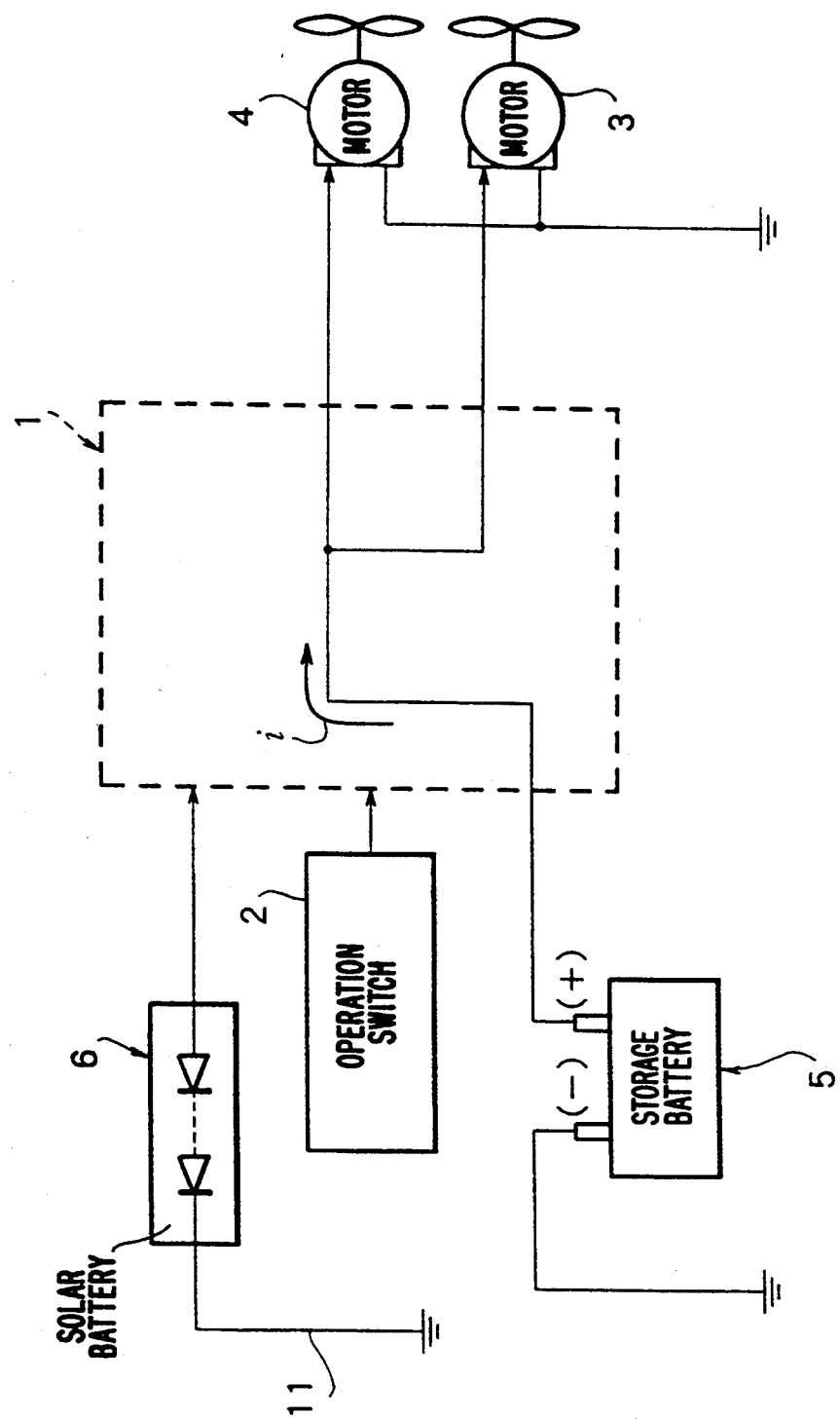

FIG. 7 shows a list of individual operation modes, FIG. 9A is a block diagram illustrating how power is supplied in the parking ventilation mode in the list shown in FIG. 7, FIG. 9B is a block diagram illustrating how power is supplied in the forced ventilation mode in the list, of FIG. 7 and FIG. 9c is a block diagram illustrating how power is supplied in the charging mode in the list of FIG 7.

Figure 8:
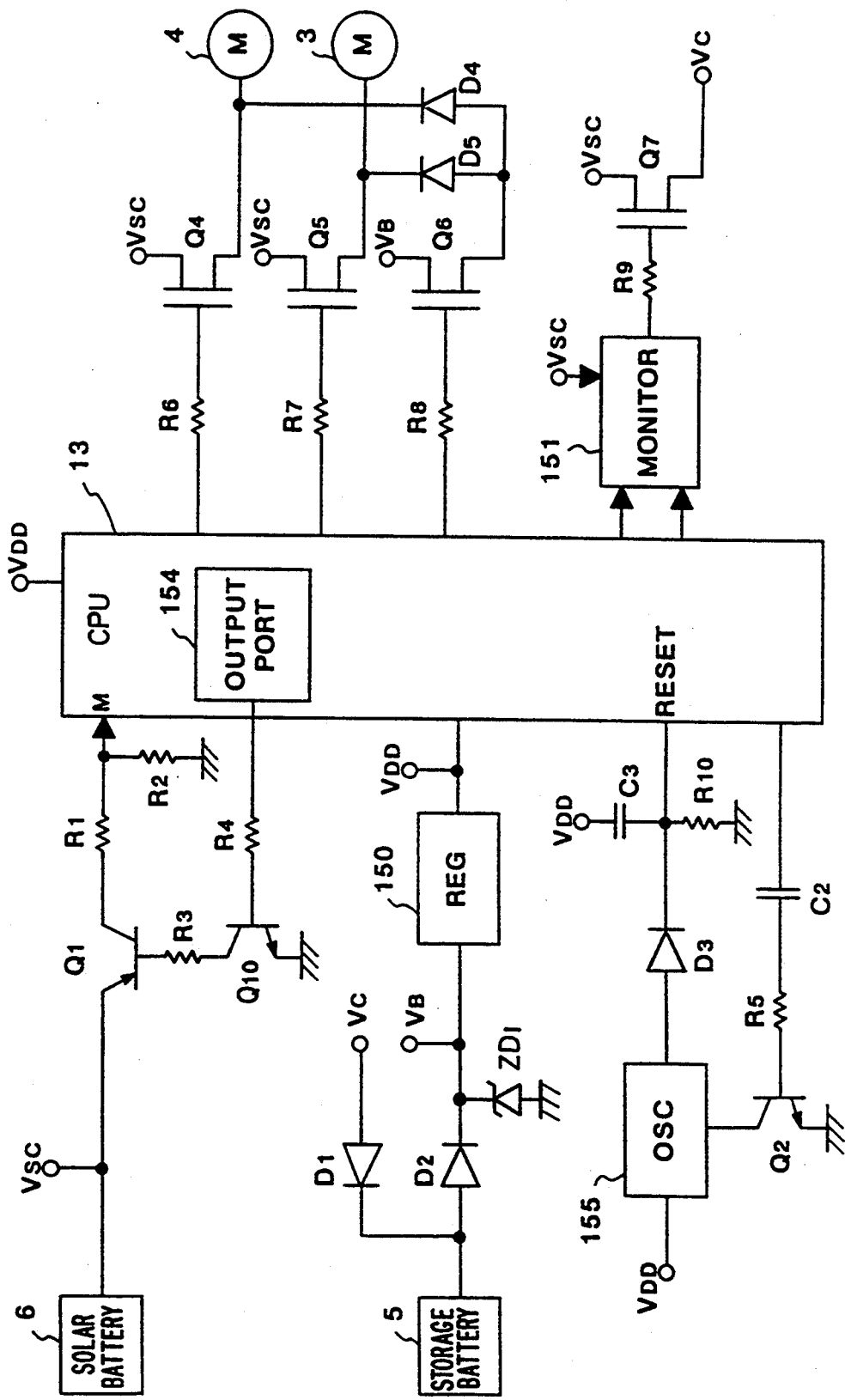
FIG. 8 is a circuit diagram of the control device.

FIG. 8 is a circuit diagram of the control device 1, illustrating connection between the solar battery 6, the storage battery 5 and fan motors 3 and 4 to the CPU 13 of the control device 1. It is, however, noted that connection between the operation switch 2, the sensor 9 and the switches 7 and 8 to the control device 1 is omitted in FIG. 8.

In FIG. 8, a diode $D_2$ and a regulater 150 (REG) form a constant voltage circuit for generating $V_{DD}$ from the voltage supplied from the storage battery 5. REG is a constant voltage circuit which contains a single transistor (not shown). REG outputs $V_{DD}$, which is the driving voltage of the CPU 13. Output $V_B$ of the diode $D_2$ is substantially equal to a Zener voltage $ZD_1$. $V_B$ is input to a transistor $Q_6$ for driving the motors 3 and 4.

The output voltage $V_{SC}$ Of the solar battery 6 is input to an interrupting circuit including a transistor $Q_1$. The interrupting circuit $Q_1$ will be described later in detail.

The output $V_{SC}$ of the solar battery is also the power source for transistors $Q_4$ and $Q_5$ for respectively driving the motors 3 and 4. More specifically, the transistor $Q_4$ is a driver for the motor 4, and the transistor $Q_5$ is a driver for the motor 3. The output of the transistor $Q_6$ is connected to the output of the transistors $Q_4$ and $Q_5$ through diodes $D_4$ and $D_5$, respectively. Therefore, the CPU 13 can selectively drive the drivers $Q_4$, $Q_5$ and $Q_6$ when it controls the voltages applied to resistors $R_6$, $R_7$ and $R_8$ respectively connected to the gates of the transistors $Q_4$, $Q_5$ and $Q_6$. In other words, when the motors 3 and 4 are to be driven by the storage battery 5, the CPU 13 turns off $Q_4$ and $Q_5$ and turns on $Q_6$. When the motors 3 and 4 are to be driven by the solar battery 6, the CPU 13 turns on $Q_4$ and $Q_5$ and turns off $Q_6$.

A monitoring circuit 151 is a comparator circuit controlled by the CPU 13, and monitors $V_{SC}$. More specifically, the monitoring circuit 151 may be made of a comparator element, such as a UPD 277 C, which receives at its inverting and noninverting input terminals voltages obtained by suitably dividing $V_{SC}$. The output of the monitoring circuit 151 is input to a gate of a transistor $Q_7$ through a resistor $R_9$, which functions as a regulator. The output $V_{SC}$ of the solar battery is input to a source of the transistor $Q_7$, and the transistor $Q_7$ makes $V_{SC}$ constant and produces $V_C$. The regulated voltage $V_C$ is returned to the storage battery 5 through the diode $D_1$.

Turning to FIGS. 7 and 9A through 9C, when the operation switch 2 is moved to the forced ventilation position when the engine is operated, the forced ventilation mode shown in FIG. 9B is set, and the ventilating fans 3 and 4 are driven in that mode. More specifically, in the forced ventilation mode, the CPU 13 turns off the transistors $Q_4$ and $Q_5$ and turns on the transistor $Q_6$. When the operation switch 2 is moved to the forced ventilation position while the engine is at a stop, the charging mode shown in FIG. 9C is set, and charging of the storage battery from the solar battery is thereby performed. More specifically, in the charging mode, the transistors $Q_4$, $Q_5$ and $Q_6$ are turned off, and the transistor $Q_7$ of the monitoring circuit 151 is turned on.

When the operation switch 2 located at the neutral off position is changed over to the forced ventilation position while the engine is operating, forced ventilation is conducted for ten minutes by the action of a power source timer. When the operation switch 2 is located at the neutral off position while the engine is at a stop, the charging mode shown in FIG. 9C is set.

When the IG key 7a is inserted although the engine is at a stop and when the operation switch 2 is locked to the parking ventilation side, the charging mode is set. When the driver removes the IG key 7a and then gets out of the car after he or she stops the engine, and when the temperature of the air is 7° C. or below, the preliminary ventilating device is operated in the charging mode.

When the driver removes the IG key 7a and then gets out of the car after he or she stops the engine, and when the temperature of the air is between 7° C. and 15° C., the preliminary ventilating device is operated in the charging mode or parking ventilation mode. When the driver removes the IG key 7a and then gets out of the car after he or she stops the engine, and when the temperature of the air is 15° C. or above, the preliminary ventilating device is operated in the parking ventilation mode shown in FIG. 9A. In the parking ventilation mode, the CPU 13 turns on the transistors $Q_4$ and $Q_5$ and turns off $Q_6$ and thereby drives the motors 3 and 4 by the solar battery.

Figure 10:
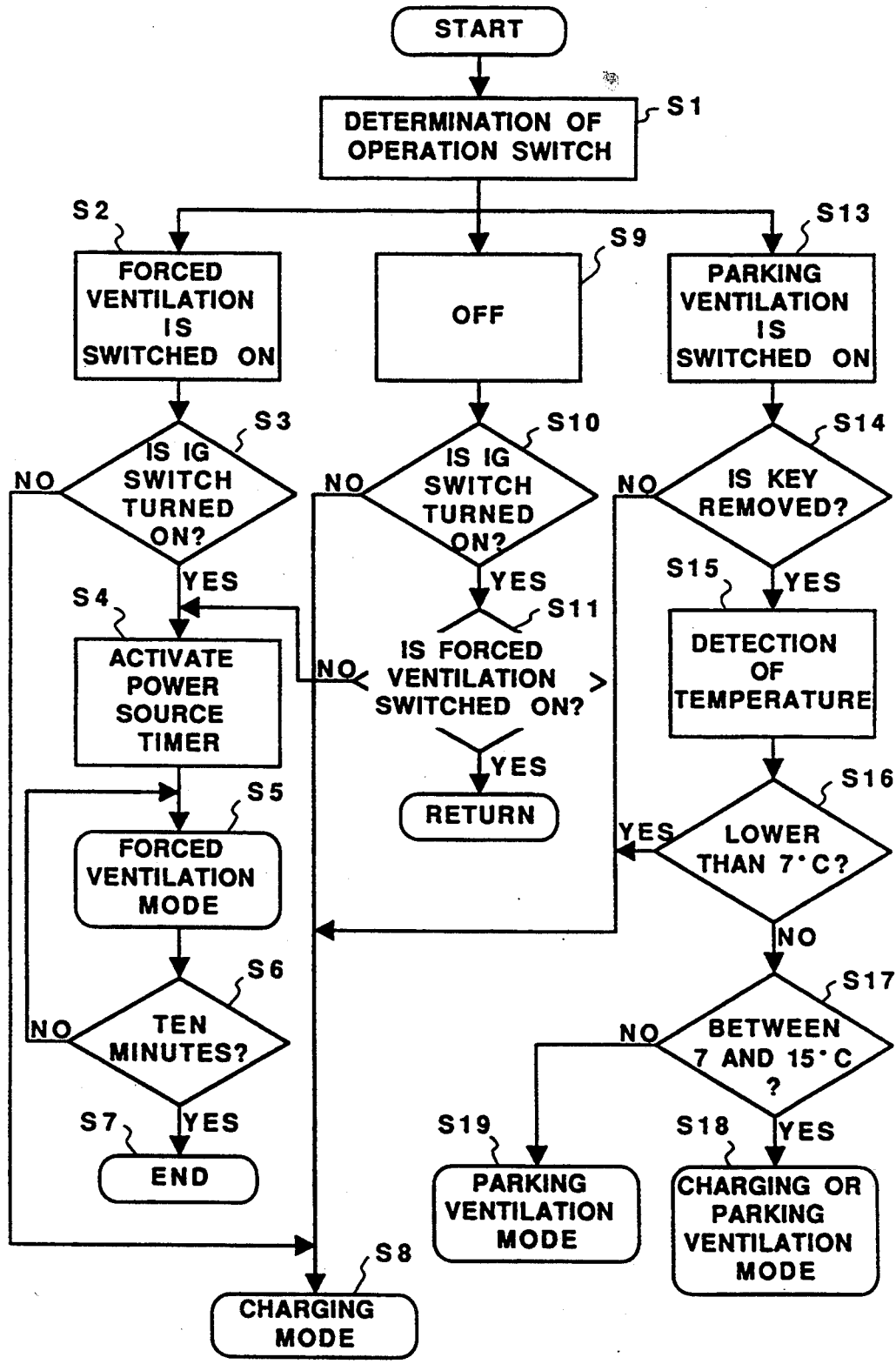
FIGS. 10 and 11 are flowcharts of the control procedures of a CPU 13 of the control device.

The aforementioned automatic mode setting is performed by the CPU 13 incorporated in the control device 1 on the basis of the control flowchart shown in FIG. 10.

More specifically, after the operation of the control device 1 having the configuration shown in FIG. 2 is initiated, the operated state of the operation switch 2 is determined in step S1. If the operation switch 2 is located at the forced ventilation position, the process goes to step S2. Thereafter, it is determined in step S3 whether or not the IG switch 8 is turned on and the engine is thereby operated. If it is determined that the engine is at a stop, the process goes to step S8 and the charging mode is set. If it is determined in step S3 that the IG switch 8 is turned on and the engine is running, the power source timer (incorporated in the CPU 13) is activated in step S4, and then the forced ventilation mode is set to drive the ventilation fans in step S5. Thereafter, it is determined in step S6 whether or not about ten minutes has elapsed since the power source timer is activated. If the answer is yes, drive of the ventilation fans is stopped in step S7.

If it is determined in step S1 that the operation switch 2 is located at the neural of E position, the process goes to step S10, and it is determined whether or not the IG switch is turned on and the engine is thereby operating. If it is determined that the engine is at a stop, the process goes to step S8 and the charging mode is set. If it is determined in step S10 that the IG switch 8 is turned on and the engine is operating, the process goes to step S11 and it is determined whether or not the operation switch is located at the forced ventilation position. If the operation switch is located at the forced ventilation position, the process proceeds to step S4, and forced ventilation is executed for ten minutes. If it is determined in step S11 that the operation switch is not located at the forced ventilation position 2a, the process returns to the initial state in step S12.

If it is determined in step S1 that the operation switch 2 is locked to the parking ventilation position, the process goes to step S14, and it is determined whether or not the IG key 7a is inserted by means of the key detection switch 7. If it is determined that the IG key 7a is inserted, the charging mode is set in step S8. If it is determined that the IG key 7a is not inserted by means of the key detection switch 7, the process goes to step S15 and the temperature measurement is executed by means of the temperature sensor 9. At that time, if the temperature of the air is, for example, 7° C. or below, i.e., if an increase in the temperature of the air in the interior of the vehicle does not occur, the charging mode is set in step S8. If it is determined in step S16 that the temperature of the air is 7° C. or above, the process proceeds to step S17 and it is determined whether or not the temperature of the air is between 7° C. and 15 ° C. If the temperature of the air is 15° C. or above, the parking ventilation mode is set in step S19. In this parking ventilation mode, power is supplied to the motors 3 and 4 from the solar battery 6.

If it is determined in Step S17 that the temperature of the air is between 7 ° C. and 15 ° C., the process goes to step S18 and either the charging mode or the parking ventilation mode is set in accordance with the amount of sunlight received by the solar battery.

Thus, the control device 1 automatically sets the operation mode. Next, the operation in the charging mode will be described below in detail.

Figure 11:
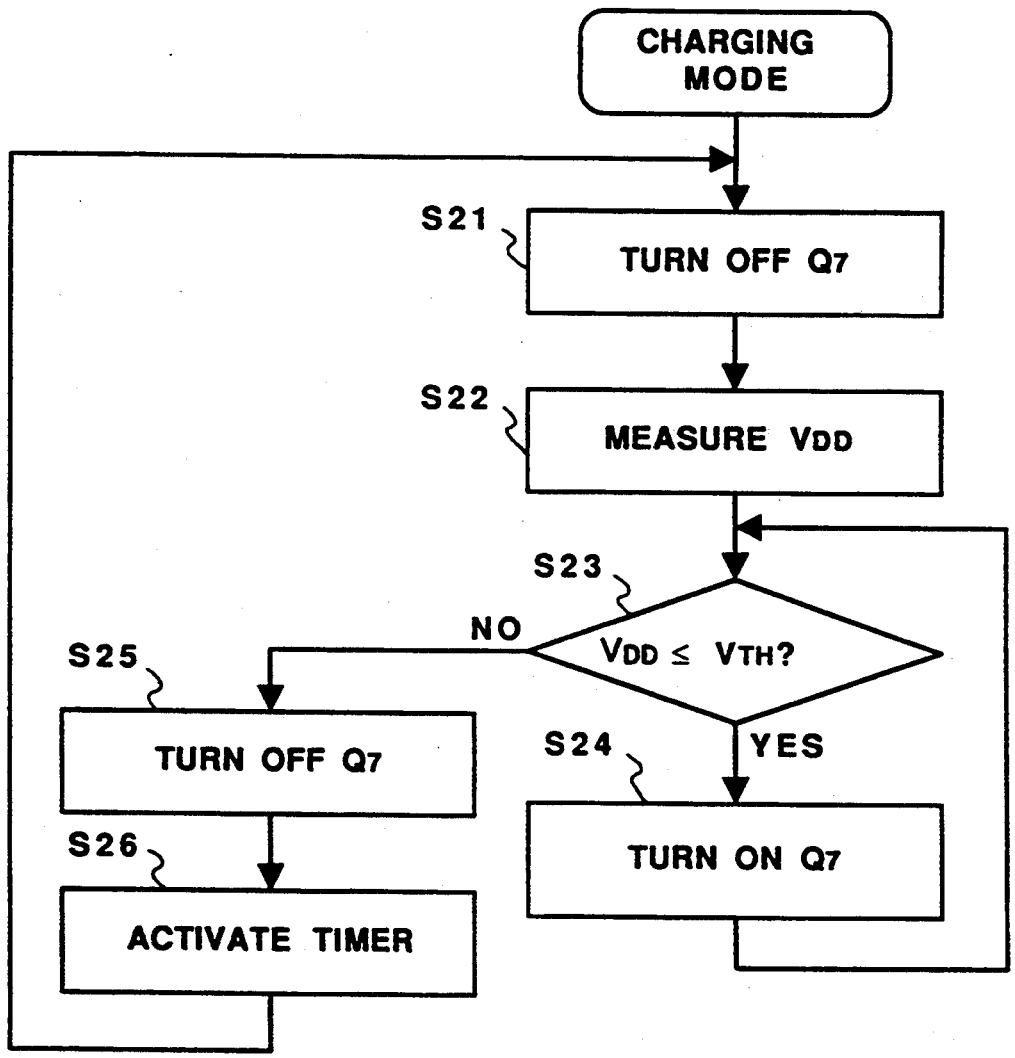

FIG. 11 is a flowchart of the control operation executed by the CPU 13 in the charging mode. When the charging mode is set, the CPU 13 turns off the transistor $Q_7$ and reduces its output $V_C$ to zero in step S21, and then voltage $V_{DD}$ of the storage battery 5 is measured in step S22. Next, it is determined in step S23 whether or not voltage $V_{DD}$ Of the storage battery 5 is equal to or lower than reference voltage $V_{TH}$. If it is determined that voltage $V_{DD}$ is equal to or lower than reference voltage $V_{TH}$, the process goes to step S24 and the transistor $Q_7$ is turned on so as to allow charging from the solar battery 6 to be performed.

When the storage battery has been charged to reference voltage $V_{TH}$, the transistor $Q_7$ is turned off so as to allow charging to be stopped. Consequently, flow of the charging current from the solar battery to the storage battery stops. When no current flows out from the solar battery, the open-circuit voltage $V_{SC}$ thereof rises to about 20 volts. Hence, the timer is activated in step S26 so as to return the process to step S21 and thereby repeat the aforementioned procedures after a predetermined period of time passes. When discharge of the storage battery is in progress, charging of the storage battery by the solar battery 6 is executed again.

How the power source for the motors 3 and 4 is changed over in each of the operation modes set by the operation of the operation switch 2 has been described.

The configuration and operation of the circuit system for protecting the CPU 13 will now be described with reference to FIG. 8. The CPU 13 is made of a CMOS microcomputer UPD7556. To monitor the output voltage $V_{SC}$ of the solar battery, it inputs voltages obtained by dividing $V_{SC}$ by the resistors $R_1$ and $R_2$. When the storage battery 5 is removed or over discharges, $V_{DD}$ is reduced to zero or less than 5 volt. When the output $V_{SC}$ of the solar battery 6 is generated in a state wherein $V_{DD} = 0$, or $\leq 5$ V, the CPU 13 may break, as stated in connection with the related art. The switching transistor $Q_{10}$ provided on a line input to the CPU 13 prevents $V_{SC}$ from being input to the CPU 13 when $V_{DD} = 0$.

The base of the transistor $Q_1$ is connected to a collector of a transistor $Q_{10}$ through a resistor $R_3$, and a base of the transistor $Q_{10}$ is connected to an output port 154 of the CPU 13 through a resistor $R_4$, such that the output port 154 serves to control the transistor $Q_1$ and transistor $Q_2$.

The CPU 13 monitors the output $V_{SC}$ of the solar battery, and reduces the output from the output port 154 to zero when the voltage of the solar battery shows abnormality. As a result, the transistors $Q_{10}$ and $Q_1$ are turned off, and $V_{SC}$ is not thereby input to the CPU 13.

When the storage battery 5 is removed and, hence, $V_{DD}$ is zero, the output port 154 of the CPU 13 composed of the CMOS type device has a high impedance. Consequently, no base current is supplied to the transistor $Q_{10}$, and $Q_{10}$ is thereby turned off. This in turn turns off the transistor $Q_1$ and interrupts input of $V_{SC}$ into the CPU 13. As a result, the CPU 13 is protected.

When the storage battery 5 is over discharged and the voltage $V_{DD}$ thereof is reduced not to zero but to a value which does not ensure normal operation of the CPU 13, the following operation is executed.

In FIG. 8, the CPU 13 has externally a reset circuit. The output of this reset circuit is input to RESET terminal of the CPU 13. When the signal input to the RESET terminal rises, the CPU 13 is reset and all the output ports of the CPU 13 thus have a high output impedance. As a result, the port 1.54 also has a high impedance, and the transistor $Q_{10}$ is turned off, thus turning off the transistor $Q_1$.

The reset circuit includes an oscillator 155 (OSC) driven by $V_{DD}$, a diode $D_3$, a transistor $Q_2$, resistors $R_5$ and $R_{10}$ and capacitors $C_{20}$ and $C_3$. The reset circuit has a power-on-resetting function and a function of monitoring the operation of the CPU 13. Resistor $R_{10}$ and capacitor $C_3$ serve as a power-on-reset circuit, and OSC 155 and transistor $Q_2$ serve as a so called watchdog circuits.

The power-on-resetting function will be described below in detail. When a new storage battery 5 is mounted, or when it is remounted, the level between the capacitors $C_3$ and $R_{10}$ rises, and the CPU 13 is reset while the potential charged in $C_3$ discharges through the resistor $R_{10}$ to decrease to a predetermined voltage level.

The watch-dog function is to monitor whether the CPU 13 functions properly. When thee CPU 13 is operated in a normal state, it continues to send pulse signals to the capacitor $C_2$. In this embodiment, it utilizes the watch-dog function to decide whether or not the storage battery 5 funtions properly. The transistor $Q_2$ repeats turning on/off in a period of that pulse signal. The oscillator 155, while it is activated, generates a high level signal in a predetermined period. The oscillation of the oscillator 155 is suspended when the transistor $Q_2$ is turned on. As long as the transistor $Q_2$ receives pulses in the predetermined period from CPU 13, the oscillator 155 is prevented from oscillating so that it may not generate a high level signal. In a case where the CPU 13 does not properly work due to the abnormality of the storage battery 5, it does not send pulses to the transistor $Q_2$ and the oscillator 155 generates a high level signal to apply it to the RESET terminal of the CPU 13. In other words, when the storage battery 5 is over discharged and, hence, the CPU 13 cannot be operated in a normal state, although $V_{DD}$ is not zero, no pulse having the aforementioned period is input to the capacitor $C_2$. Consequently, a reset signal is generated to reset the CPU 13. As a result, the transistors and $Q_1$ are turned off, and $V_{SC}$ is not input to the CPU 13.

When the storage battery 5 is removed or over discharges, the output of the output pot 154 lowers or has a high impedance. Consequently, the transistors $Q_{10}$ and $Q_1$ are turned off, and $V_{SC}$ is not input to the CPU 13. As a result, the CPU 13 is protected.

Figure 12:
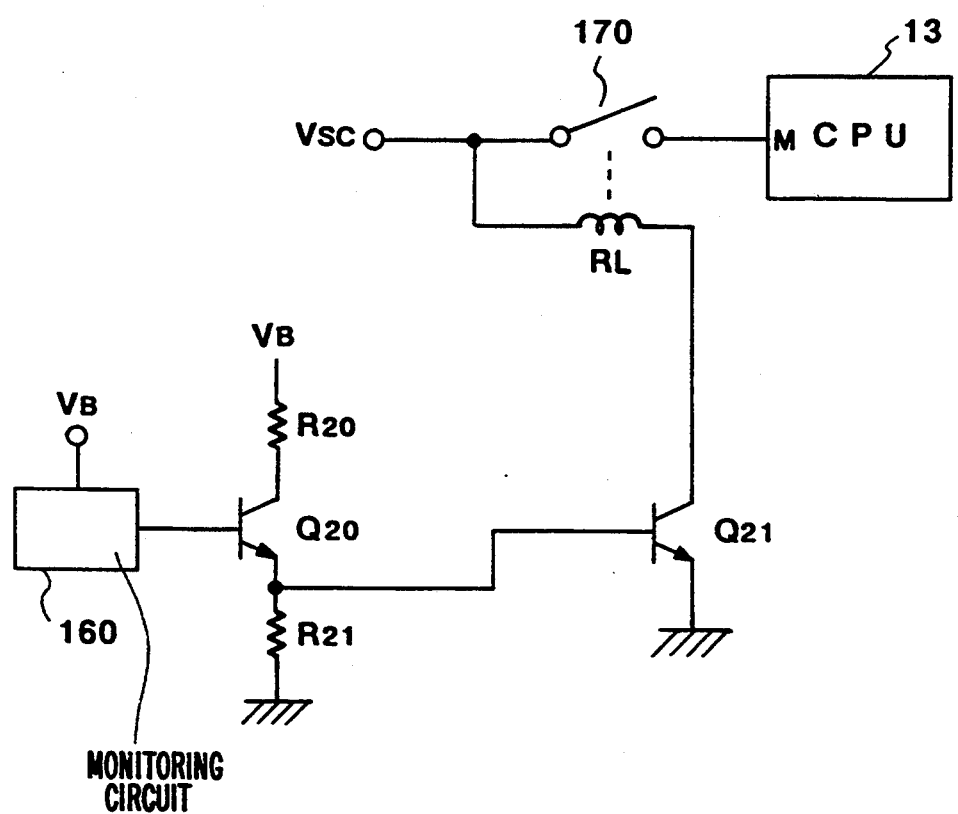
FIG. 12 is a schematic view showing a further embodiment of the invention.

It is to be understood that the form of the present invention herein shown and described is to be taken as a preferred example of the same and that various changes may be resorted to without departing from the spirit and scope of the invention. For example, a modification shown in FIG. 12 is possible. In this modification, a relay RL is used in place of the interrupting circuit employing the transistor $Q_1$.

When a transistor $Q_{21}$ is turned on, the relay RL is driven by the voltage $V_{SC}$ and a normally-opened contact 170 of the relay RL is closed to input $V_{SC}$ to the CPU 13. A base of the transistor $Q_{21}$ is driven by an emitter potential of the transistor $Q_{20}$. A base of the transistor $Q_{20}$ is connected to a circuit 160 for monitoring the output $V_B$ of the storage; voltage 5. The monitoring circuit 160 outputs a high level voltage when the storage battery can output a voltage which assures normal operation of the CPU 13. In that case, the emitter potential of the transistor $Q_{20}$ rises, turning on $Q_{21}$ and the relay RL. Consequently, $V_{SC}$ is input to the CPU 13. When the storage battery 5 is removed or output voltage thereof reduces, the transistor $Q_{20}$ is turned off or the emitter potential thereof lowers. Consequently, the transistor $Q_{21}$ is turned off to open a contact 170 and the CPU 13 is thereby protected.

In another modification, the present invention can also be applied to a system which employs a solar battery alone and does not employ a storage battery. In such automobiles, an electronic device such as CPU 13 receives the regulated output of the solar battery via a fuse at the power terminal thereof, and the non-regulated output of the battery for monitoring. If the fuse is removed or open, the device without power supply receives the output of the battery and thus is susceptible to damage due to the problem as described above.

The present invention is not limited to the above embodiment and various changes and modifications can be made within the spirit and scope of the present invention. Therefore, to apprise the public of the scope of the following invention, the following claims are made.

WHAT IS CLAIMED IS:

1. A protecting apparatus for protecting an electronic device, the electronic device being provided on a vehicle having a storage battery and a solar battery, and being capable of operating under an output voltage supplied from outputs of the storage battery and the solar battery, the protecting apparatus comprising:

a reset circuit including means for monitoring normal operation of said electronic device determining whether or not the electronic device operates normally, and resetting the electronic device when it is determined that the electronic device does not operate normally;

an interruption circuit for interrupting a path on which the voltage is supplied from the solar battery to the electronic device: and a control means in said electronic device responsive to said reset circuit for controlling said interruption circuit to interrupt the path from the solar battery to the electronic device when the electronic device is reset by the reset circuit, so that the electronic device may be protected.

2. A protecting apparatus according to claim 1, wherein said interruption comprises a switching circuit in the path between the output of the solar battery and the electronic device.

3. A protecting apparatus according to claim 2, wherein said switching circuit includes a control terminal for controlling the switching circuit to interrupt the path on which voltage is supplied from the solar battery to the electronic device and wherein an output signal of said control means is input to the control terminal of said switching circuit.

4. A protecting apparatus according to claim 3, wherein said control means comprises an output port provided in said electronic device which is connected to the control terminal of said switching circuit, the output impedance of said output port being high when said electronic device is reset by said reset circuit.

5. A protecting apparatus according to claim 1, wherein said electronic device comprises a CMOS element which uses the output of the storage battery as a power source.

6. A protecting apparatus according to claim 1, wherein said electronic device is a micro, computer, and the reset circuit comprises a power-on-reset circuit for said microcomputer.

7. A protecting apparatus according to claim 1, wherein the electronic device includes a CMOS element and the CMOS element is protected by interrupting the path from the solar battery to the electronic device.

* * * * *

UNITED STATES PATENT AND TRADEMARK OFFICE
CERTIFICATE OF CORRECTION

PATENT NO. : 5,414,306
DATED : May 9, 1995
INVENTOR(S) : Yoshihisa KANNO et al.

It is certified that error appears in the above-indentified patent and that said Letters Patent is hereby corrected as shown below:

Column 1,   line 39, change "so," to --so--;
               line 40, change "circuits." to --circuit.--;
               line 55, change "switching" to --CMOS--.

Column 2,   line 1, change "reason" to --reasons--.

Column 3,   line 27, change "FIGS. 6" to --FIGS. 6A--.

Column 4,   line 23, change "output band J" to --outputs B and J--;
               line 32, change "W" to --L--.

Column 7,   line 15, change "of E" to --off--;
               line 51, change "Step" to --step--;

Column 8,   line 31, change "$Q_{10}$" to --$Q_1$--;
               line 37, after "and" insert --the--;
               line 38, change "$Q_2$" to --$Q_{10}$--;
               line 65, change "Rio" to --$R_{10}$--.

UNITED STATES PATENT AND TRADEMARK OFFICE
CERTIFICATE OF CORRECTION

PATENT NO. : 5,414,306   Page 2 of 2
DATED : May 9, 1995
INVENTOR(S) : Yoshihisa KANNO et al.

It is certified that error appears in the above-indentified patent and that said Letters Patent is hereby corrected as shown below:

Column 9,  line 33, change "and $Q_1$," to --$Q_{10}$ and $Q_1$--;
           line 36, change "pot" to --port--;
           line 54, change "storage;" to --storage--.

Column 10, line 38, change "interruption comprises" to --interruption circuit comprises--;
           line 59, change "micro, computer," to --microcomputer,--.

Signed and Sealed this

Twenty-eighth Day of November 1995

Attest:

BRUCE LEHMAN

*Attesting Officer*   *Commissioner of Patents and Trademarks*